(12) United States Patent
Colasante

(10) Patent No.: US 10,037,752 B1
(45) Date of Patent: Jul. 31, 2018

(54) ORTHOSONIC THRUST APPARATUS AND METHOD

(71) Applicant: David A Colasante, Newtown Square, PA (US)

(72) Inventor: David A Colasante, Newtown Square, PA (US)

( * ) Notice: Subject to any disclaimer, the term of this patent is extended or adjusted under 35 U.S.C. 154(b) by 1125 days.

(21) Appl. No.: 14/269,088

(22) Filed: May 3, 2014

(51) Int. Cl.
*G10K 9/18* (2006.01)
*G10K 9/02* (2006.01)
*G10K 9/08* (2006.01)

(52) U.S. Cl.
CPC ............. *G10K 9/18* (2013.01); *G10K 9/02* (2013.01); *G10K 9/08* (2013.01)

(58) Field of Classification Search
CPC .............. G10K 9/18; G10K 9/02; G10K 9/08
See application file for complete search history.

(56) References Cited

U.S. PATENT DOCUMENTS

| 5,020,977 A | * | 6/1991 | Lucas | F03G 7/002 417/322 |
| 5,319,938 A | * | 6/1994 | Lucas | G10K 15/04 62/467 |
| 5,357,757 A | * | 10/1994 | Lucas | F03G 7/002 62/467 |
| 5,515,684 A | * | 5/1996 | Lucas | F25B 1/00 60/520 |
| 6,079,214 A | * | 6/2000 | Bishop | F04F 7/00 62/467 |
| 6,672,847 B2 | * | 1/2004 | Dooley | F04B 43/09 417/394 |
| 8,967,965 B1 | * | 3/2015 | Colasante | G10K 9/122 294/185 |

OTHER PUBLICATIONS

Faradave, Oct. 20, 2010, Orthosonic Lift, Physics Forum, Posts 1-3 and 17.*
Faradave, Mar. 30, 2015, Orthosonic Lift, 2015 Update.*

* cited by examiner

*Primary Examiner* — Patrick Maines
(74) *Attorney, Agent, or Firm* — Robert J. Yarbrough; Lipton, Weinberger & Husick

(57) ABSTRACT

An acoustically resonating medium has one or more nodes and anti-nodes. Insulating a first side of a resonating medium at a node from ambient air and exposing the opposite second side of the resonating medium at the node to ambient air results in thrust in the direction of the first side. Insulating the second side of a resonating medium at an anti-node from ambient air and exposing the first side of the medium at the anti-node to ambient air also results in thrust in the direction of the first side.

20 Claims, 10 Drawing Sheets

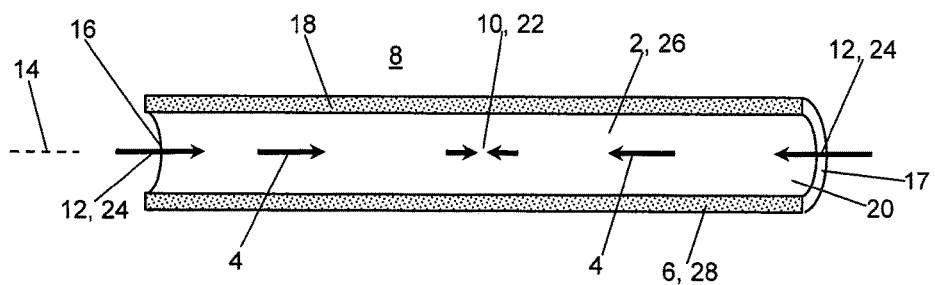
Prior Art                                Fig. 1
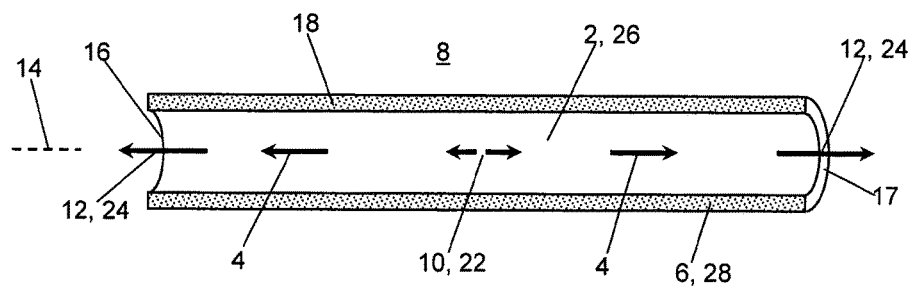
Prior Art                                Fig. 2

ORTHOSONIC THRUST APPARATUS AND METHOD

I. RELATED APPLICATIONS

This document incorporates U.S. patent application Ser. No. 14/194,761 filed Mar. 2, 2014 and entitled 'Apparatus and Method for Orthosonic Lift by Deflection' as if set forth in full herein.

II. BACKGROUND OF THE INVENTION

A. Field of the Invention

The apparatus and method of the Invention relate to the generation of thrust through acoustic resonance of a medium that is immersed in air or a fluid.

B. Statement of the Related Art

Sound is a vibration that propagates as a mechanical wave of pressure and displacement through a medium. The 'medium' is the material through which the sound wave propagates and may be any form of matter, including a gas, liquid, solid or plasma. As used in this document, the term 'sound' refers to waves of any frequency and not only to those frequencies within the range of human hearing. When a medium is excited, for example when the air in an open-ended tube is excited by a loudspeaker, sound waves will travel through the air within the tube in a direction of sound wave propagation. The particles (atoms or molecules) of the medium oscillate about their original locations first moving in one direction then in a reverse direction, usually periodically and generally returning to their original locations. The longitudinal aspect of a sound wave refers to particle oscillations along the direction of sound propagation. As used in this document, the term 'orthosonic' means perpendicular to, or transverse to, the direction of sound propagation.

The speed at which the sound waves propagate through the medium is determined by the acoustical impedance of the medium. The acoustical impedance is frequency-dependent and is a measure of how much sound pressure is generated by vibration of the particles of the medium. If the traveling sound waves encounter a discontinuity in the medium; that is, a location at which the acoustical impedance changes abruptly, then the travel of the sound waves is interrupted and a portion of the energy of the sound waves is reflected from the discontinuity. In the examples of the open-ended tube, when the sound waves reach the open end of the tube, the acoustic impedance changes and a portion of the energy of the sound waves is reflected from the open end of the tube and travels in the opposite direction within the air contained in the tube.

If the initial sound waves and the reflected sound waves are of the 'natural' frequency of the acoustic system through which the sound propagates, the reflected sound waves will reinforce the incident sound waves to cause the acoustic system to resonate. An acoustic system will have one or more natural frequencies; that is, frequencies at which the acoustical system will resonate. Acoustic resonance is the tendency of an acoustic system to absorb more energy at a natural frequency of the acoustic system in preference to energy of other frequencies. All forms of matter, including solids, liquids, gases and plasmas can resonate acoustically. In the example of the open-ended tube, if the air in the tube is excited at one end, a natural frequency of the air in the tube will correspond to a wavelength of sound that is twice the length of the tube. The air in the tube will have additional resonant frequencies.

When an acoustic system is resonating at a natural frequency of the system, the sound waves contained by the system are considered stationary 'standing' waves with respect to the system, rather than traveling waves. The resonating acoustic system will define one or more nodes and anti-nodes. The 'node' and the 'anti-node' are complementary, stationary locations within the resonating medium. At the node, the transverse pressure within the medium oscillates more than at the anti-node. The medium at the node is analogous to a balloon filled with air that is first squeezed and then released at the resonating frequency of the acoustic system, increasing and decreasing the pressure within the medium at the node. At the anti-node, the locations of the particles of the medium oscillate along the axis of sound wave propagation by an amount greater than at the node. In short, the pressure fluctuation at the node is greater than at the anti-node and the oscillating movement at the anti-node is greater than at the node.

Prior art aerodynamic lift is generated by the flow of air in one direction from the leading edge of a wing to the trailing edge of the wing attributable to the well-known Bernoulli principle. As used in this document, the term 'air' means atmospheric air and also means any gas or liquid. According to the Bernoulli principle, the difference in static pressure applied by the air on a surface perpendicular to the direction of flow of air at two locations is proportional to the difference in the squares of the velocity of the air with respect to the surface at the two locations. Necessary corollaries of the Bernoulli principle are that velocity of the air is relative to the surface. Either the air, the surface, or both may be moving. In addition, the relative velocity occurs in the boundary layer of air immediately adjacent to the surface, because only particles of the air immediately adjacent to the surface may interact with the surface. Also, the relation between velocity and static pressure is virtually instantaneous. A change in velocity causes an immediate change in static pressure. From the Bernoulli principle and all other things being equal, the faster the movement of air, the lower the static pressure exerted by the air.

The prior art does not teach the apparatus or method of the Invention.

III. BRIEF DESCRIPTION OF THE INVENTION

The inventor had the original insight that the Bernoulli principle applies independently from the direction of movement and applies if the air is oscillating parallel to the surface or if the surface is oscillating parallel to the boundary with the air. The inventor also had the original insight that an acoustically resonating medium immersed in a gas or liquid may act as a momentum and energy pump and may pump momentum and energy from the air or liquid on one side of the medium to the air or liquid other side of the medium, which may result in a net thrust applied to the medium. In addition, the inventor had the insight that sound waves, which are generally considered to be longitudinal waves, have a transverse wave component that can be exploited to transfer momentum and energy or that can be exploited to transfer heat. The Invention stems from these insights.

The Invention is an apparatus and method for generating thrust using acoustic resonance. The apparatus is composed of a medium having a shape that will acoustically resonate at a natural frequency, a barrier having an acoustic impedance that is substantially different from that of the medium, and an exciter configured to excite the medium so that the medium resonates at the natural frequency. The medium will have one or more nodes and anti-nodes when the medium is acoustically resonating. The apparatus generates a net thrust by emitting momentum from the node(s) of the resonating medium into the gas or liquid into which the apparatus is immersed in the direction opposite to the intended direction of thrust, by absorbing momentum from the air or liquid at the anti-nodes in the direction of the thrust, or by both emitting momentum from the nodes and absorbing momentum at the anti-nodes.

As used in this document, the term 'transverse pressure' refers to the pressure perpendicular, or transverse, to the direction of sound propagation within the medium. The term 'acoustic radiation pressure' refers to pressure applied by an acoustically excited medium to a surrounding gas or liquid.

A. Medium is a Liquid or Gas

Where the vibrating medium is a liquid or gas, the barrier defines the shape of the resonating medium, segregates the medium from the surrounding liquid or gas, determines the natural frequencies at which the medium will resonate, and defines the locations of the nodes and anti-nodes. The barrier controls the interaction of the resonating medium and the liquid or gas in which the medium is immersed.

For a liquid or gaseous medium, the barrier defines at least one vent communicating through the barrier so that the liquid or gaseous medium within the barrier is exposed to the liquid or gas surrounding the barrier. A first side of the medium is in the desired direction of thrust. A second side of the medium is opposite to the desired direction of thrust. Vents may be located at the node, at the anti-node, or a combination of nodes and anti-nodes. If a vent is located at the node, then the vent is located on the second side of the medium opposite to the intended direction of thrust. If the vent is located at the anti-node, then the vent is located on the first side of the barrier, on the side corresponding to the direction of thrust.

Where the medium is air (including any liquid or gas), the vent at the node creates acoustic radiation pressure at the node on the side of the medium away from the intended direction of thrust. Within the barrier, the same pressure develops a force on the barrier in the intended direction of thrust. Since the air pressure acting on the inside of the barrier at the node in the direction of thrust is greater than the ambient air pressure acting on the outside of the barrier at the same location, the result is a net thrust acting on the barrier. Another way to consider the node vent is that the particles of air at the node also are oscillating, but are oscillating transverse to the direction of sound propagation. The air oscillating at the node transverse to the direction of sound propagation tends to transfer more momentum to the ambient air at the vent than the ambient air at the vent transfers to the oscillating air at the node. The result is a net thrust applied to the oscillating air and hence to the barrier.

Where the medium is air (including any liquid or gas), the vent at the anti-node exposes the air oscillating at the anti-node to the ambient air surrounding the barrier. Extending the Bernoulli principle, the transverse pressure of the oscillating air is reduced from the ambient pressure in proportion to the difference in the mean squared velocity of the oscillating air and the ambient air. The ambient air pressure acting on the barrier on the opposite side of the medium is greater than the reduced transverse pressure at the anti-node vent, resulting in a net thrust acting on the barrier. Another way to consider thrust generated at the anti-node vent is that the ambient air at the anti-node vent tends to give up more momentum to the oscillating air at the anti-node than the oscillating air at the anti-node gives up to the ambient air, resulting in a net thrust acting on the medium and hence the barrier. Vents at the anti-node and node in combination act as a momentum pump; namely, momentum is pumped into the oscillating medium at the anti-node vent and pumped out of the medium at the node vent.

B. Medium is a Solid

Where the medium is a solid, the barrier does not define the shape of the medium and the barrier may be supported by the solid medium. The barrier controls the interaction between the resonating solid medium and the surrounding ambient air (including any liquid or gas) in which the solid medium is immersed. The acoustical impedance of the barrier is selected to be different from the acoustical impedance of the medium so that the barrier acts as a discontinuity to sound transmission from the medium. Where a barrier is interposed between the solid medium and the ambient air, the oscillating surface of the resonating solid medium has little interaction with the ambient air. Where there is no barrier, the oscillating surface of the solid medium has more interaction with the ambient air.

At the node, the surface particles of the solid medium oscillate transverse to the direction of sound wave propagation. The barrier is disposed at the location of the node on the first side of the solid medium and in the direction of thrust. The barrier thus prevents interaction between the transversely oscillating surface of the solid medium and the ambient air in the direction of thrust. The barrier is not disposed on the second side of the solid medium opposite to the direction of thrust and the second side of the solid medium is exposed to the ambient air and can interact with the ambient air. The oscillating surface particles of the solid medium on the second side transfers more momentum to the particles of ambient air than is absorbed by the oscillating medium from the ambient air. The first side of the solid medium is insulated from the ambient air by the barrier and does not transfer momentum to the ambient air. The net result is a force acting on the solid medium in the intended direction of thrust.

At the anti-node, the surface particles of the solid medium oscillate along the axis of sound propagation. The barrier is disposed on the second side of the medium at the anti-node, opposite to the intended direction of thrust. The surface particles of the solid medium at the anti-node oscillate parallel to the surface in the direction of sound propagation and at the expense of motions normal to the surface. This effectively reduces pressure normal to the surface to below that of the surrounding air. As a result, more momentum is absorbed on the exposed first side of the solid medium at the anti-node than on the second side of the solid medium, which is insulated by the barrier. This is analogous to Bernoulli's principle, where flowing particles exhibit a decrease in static pressure, transverse to the flow. The ambient pressure on the barrier in the direction of thrust is greater than the pressure of the medium in the opposite direction. Selectively exposed nodes and antinodes may be employed alone or in combination to produce a net thrust acting on the barrier and hence the solid medium.

C. Exciter

The exciter may be any mechanism capable of causing the medium to resonate at the natural frequency. Where the medium is a liquid or gas, the exciter may be a loudspeaker having a transducer driving a diaphragm. The exciter may be one or a pair of vibrating reeds powered by a small amount of air moving passing the reed, such as a clarinet or oboe reed, or a free reed such as an accordion reed, or a reed powered by an oscillating magnetic field. The exciter may be a piston reciprocating in a cylinder, with the resulting oscillating air ducted to the medium. The exciter may be the oscillating diaphragm, as in a mechanical diaphragm pump. The exciter may a transducer or a piezoelectric material. The piezoelectric material may be a piezoelectric film. Where the medium is a solid, the exciter may be coupled directly to the medium.

For exciters that are electromechanical transducers, such as loudspeakers or piezoelectric materials, the exciter may be powered by a signal from an oscillator amplified by an amplifier.

IV. BRIEF DESCRIPTION OF THE FIGURES

FIG. 1 is a schematic representation of air resonating in an open-ended cylinder, the air moving in a first direction.

FIG. 2 is the schematic representation of FIG. 1 with the air moving in the opposite direction.

V. DESCRIPTION OF AN EMBODIMENT

Figure 3:
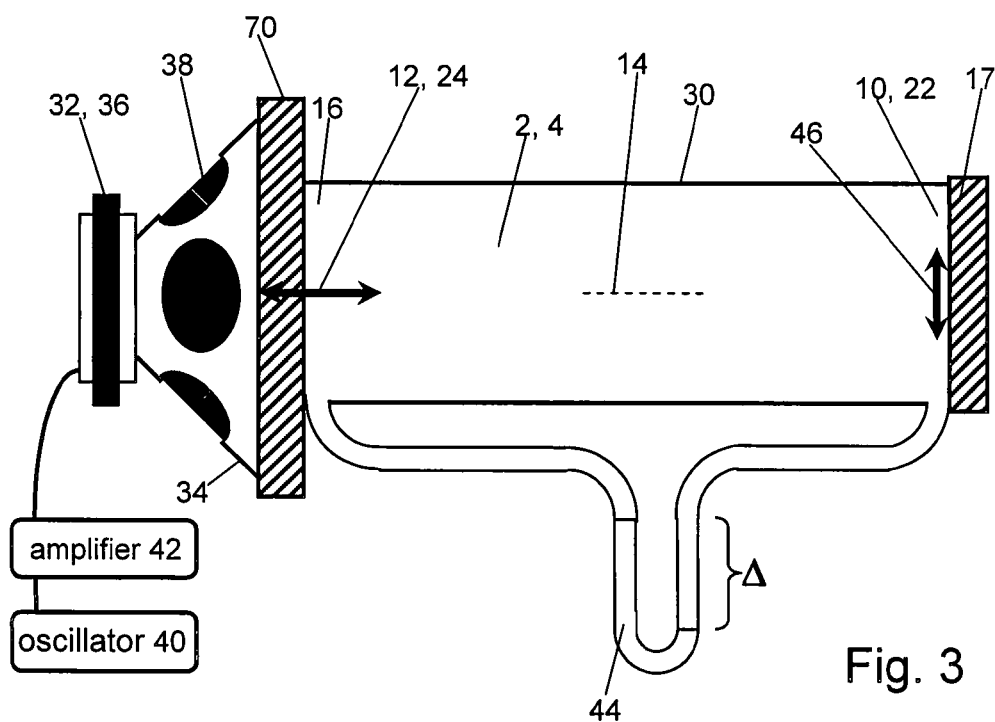
FIG. 3 is a schematic representation of air resonating in a closed cylinder.

FIGS. 1 and 2 illustrate a medium 2 that is resonating acoustically. In this instance, the medium is air 4 (defined to include any gas or liquid) located within an open-ended cylinder 6. The open-ended cylinder is immersed in ambient air 8 (also defined to include any gas or liquid). The fundamental frequency of the sound causing the air 4 to resonate is a frequency corresponding generally to a wavelength that is twice the length of the open-ended cylinder 6. The movement of the resonating air 4 within the cylinder 6 alternates between moving toward a node 10, shown by FIG. 1, and moving away from the node 10, shown by FIG. 2. When the air 4 moves toward the node 10, the transverse pressure of the air 4 at the node increases. When the air 4 moves away from the node 10, the transverse pressure of the air at the node 10 decreases.

The cylinder 6 also defines two anti-nodes 12 within the cylinder 6. At the anti-nodes 12, the air is in oscillating longitudinal motion along the axis 14 of sound wave propagation and experiences very little change in transverse pressure. The anti-nodes of the cylinder 6 correspond to the first end 16 and second end 17.

The cylinder 6, shown in cross section, is an enclosure or barrier 18 that segregates the resonating medium 2, in this case air 4, from the ambient air 8. The resonating medium 2 has a shape 20, which for a medium 2 that is a gas or liquid is defined by the barrier 18. The resonant frequencies of the medium 2 and the node location 22 and anti-node location 24 are determined in part by the shape 20 of the medium 2.

The medium 2 has a first acoustical impedance 26 and the barrier 18 has a second acoustical impedance 28 that is different from the first acoustical impedance 26. As a result, sound energy in the medium 2 does not readily cross the barrier 18 and into the ambient air 8. In the case of the open-ended cylinder 6, unreflected sound energy escapes from the open ends 16, 17 of the cylinder 6.

FIG. 3 illustrates a standing sound wave where the resonating medium 2 is air 4 and where the barrier 18 is a cylinder 30. The second end 17 of the cylinder 30 is closed. An exciter 32 includes a loudspeaker 34 comprising a transducer 36 and diaphragm 38. The loudspeaker is located at the first end 16 of the cylinder 30 and driven by an oscillator 40 and amplifier 42 at the resonant frequency of the closed cylinder 30. In the instance of the cylinder 30 with a closed second end 17, the resonant frequency has a wavelength of generally four times the length of the cylinder 30.

For the closed cylinder 30 of FIG. 3, the closed end 17 of the cylinder defines the node location 22 of the node 10 and the exciter 32 defines the anti-node location 24 of the anti-node 12. At the anti-node 12, air 4 oscillates along the axis of sound wave propagation 14. At the node 10, the transverse air pressure oscillates, as indicated by arrow 46. Pressure gauge 44 illustrates that the average transverse air pressure at the node 10 is greater than (A) the average transverse air pressure at the anti-node 12.

Figure 4:
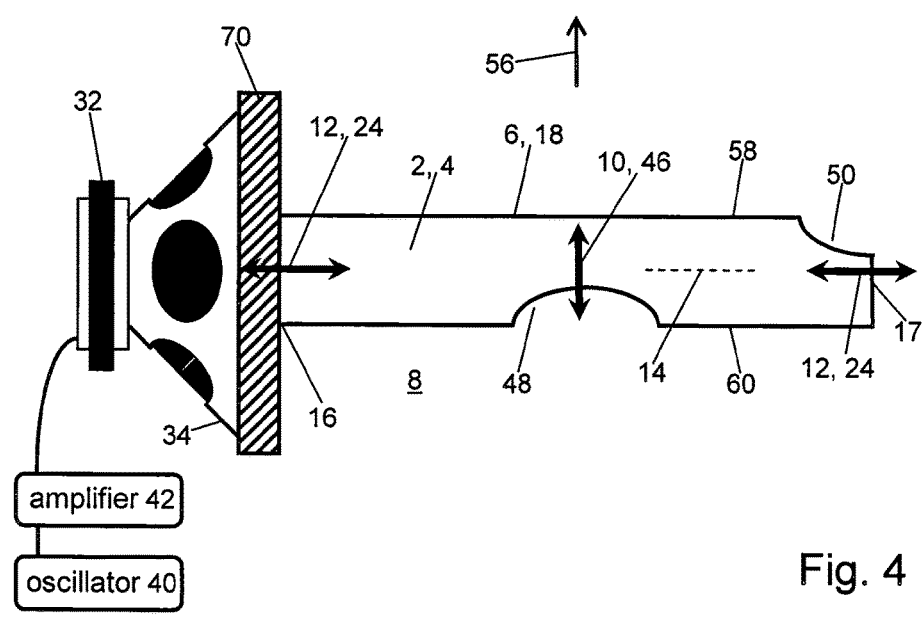
FIG. 4 is an open-ended tube with vents at the node and anti-node.
Figure 6:
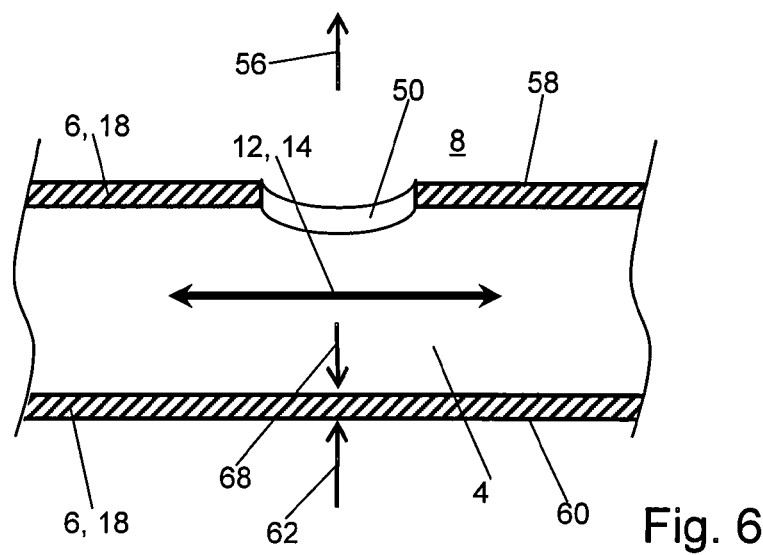
FIG. 6 is a detail cross section of a vent at an anti-node.
Figure 5:
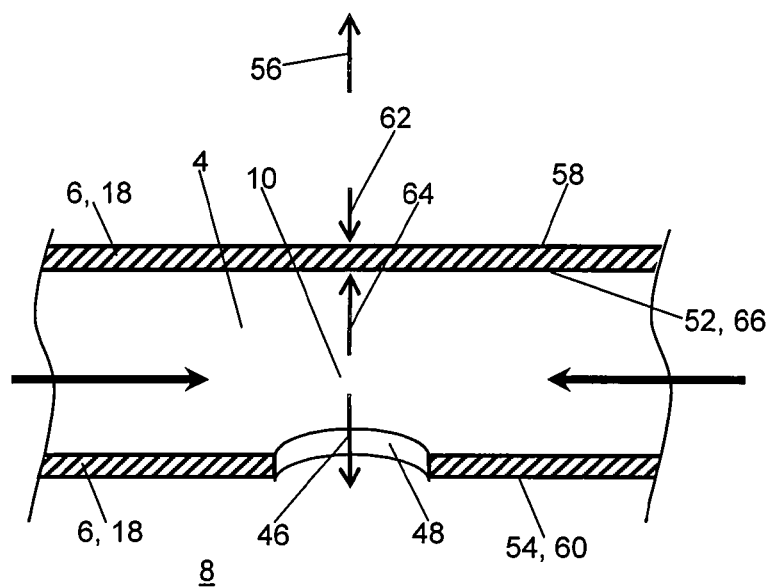
FIG. 5 is a detail cross section of a vent at a node.

FIGS. 4, 5 and 6 illustrate the orthosonic thrust of the Invention in the case of a cylinder 6 where the medium 2 is air 4 and the first end 16 and second end 17 are effectively open. From FIG. 4, the air 4 inside the open-ended cylinder 6 is excited by an exciter 32, in this instance a loudspeaker 34, at a resonant frequency of the cylinder 6. The loudspeaker 34 is located at an anti-node location 24 and air 4 oscillates along the axis of sound propagation 14. The open cylinder 6 defines a second anti-node 12 at the second end 17 of the cylinder 6 and a node 10 intermediate to the anti-nodes 12 within the cylinder 6.

The cylinder 6 of FIG. 4 may include a node vent 48, an anti-node vent 50, or both a node vent 48 and anti-node vent 50. FIGS. 5 and 6 are detail cross sections of the node vent 48 and an anti-node vent 50, respectively. The node vent 48 and anti-node vent 50 penetrate the barrier 18, which is cylinder 6, from the interior 52 of the barrier 18 to the exterior 54 of the barrier 18. The air 4 within the cylinder 6 is in communication with the ambient air 8 at the node 10 through the node vent 48. The air 4 within the cylinder 6 at the anti-node 12 is in transverse communication with the ambient air 8 through the anti-node vent 50 and in longitudinal communication with the ambient air 8 through the second end 17.

The direction of thrust 56 is determined by the locations of the node vent 48 and anti-node vent 50. The barrier 18 has a first side 58 in the direction of thrust 56 and a second side 60 opposite to the first side 58 and away from the direction of thrust 56. The node vent 48 penetrates the barrier 18 on the second side 60, the side opposite to the direction of thrust 56. The anti-node vent 50 penetrates the barrier 18 on the first side 58, corresponding to the direction of the thrust 56. The vents selectively expose the excited medium 2 to the ambient air 8, transverse to the axis of sound propagation 14.

From FIG. 5, when the air 4 is resonating in the cylinder 6, the air 4 at the node 10 vibrates transversely, indicated by arrow 46, and the average transverse air pressure 64 at the node 10 is increased over the ambient pressure 62. The average transverse air pressure 64 at the node 10 acts on the inside surface 66 of the barrier 18 in the direction of thrust 56 and opposite to the node vent 48. Because the average air pressure 64 at the node 10 is greater than ambient pressure 62, the result is a net force in the direction of desired thrust 56. As an alternative explanation, the transversely-oscillating air 4, indicated by arrow 46, at the node 10 imparts more momentum on the ambient air 8 than it absorbs from the ambient air 8, resulting in a net emission of momentum from the resonating air 4 in the direction opposite to the direction of thrust 56. The system of oscillating air 4 and the barrier 18 is thus urged in the direction of thrust 56 by conservation of momentum.

FIG. 6 illustrates an anti-node vent 50, which is located on the first side 58 of the barrier 18 and toward the direction of thrust 56. At the anti-node 12, air 4 oscillates along the axis of sound propagation 14. Extending the Bernoulli principle, the transverse pressure 68 of the oscillating air at the anti-node vent 50 is reduced below ambient pressure 62 because of the high relative squared velocity of the resonating air 4 within the cylinder 6 at the anti-node 12 compared to the ambient air 8. The ambient air 8 acting on the second side 60 of the barrier 18 opposite to the anti-node vent 50 is effectively stationary and so the ambient air pressure 62 on the second side 60 is not reduced. The result is that the net pressure acting on the barrier 18 urges the barrier 18 in the direction of thrust 56. A complementary explanation is that the oscillating air 4 at the anti-node vent 50 absorbs more momentum from the ambient air 8 than it emits to the ambient air 8. The system of oscillating air 4 and the barrier 18 are thus urged in the direction of thrust 56 by conservation of momentum.

Figure 7:
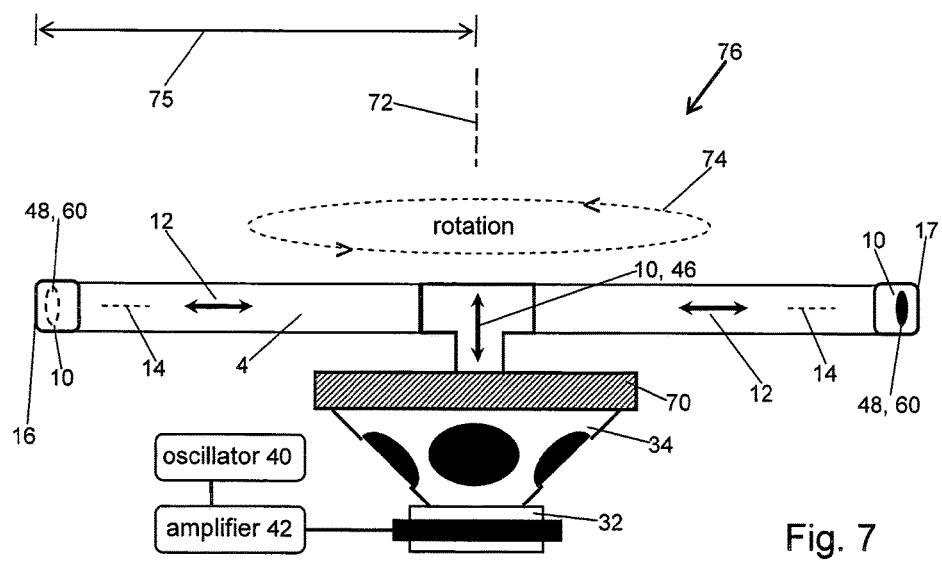
FIG. 7 is a rotor motivated by orthosonic thrust.

FIG. 7 illustrates a demonstration apparatus for orthosonic thrust by acoustical resonance. An exciter 32 in the form of a loudspeaker 34 is activated by an oscillator 40 and amplifier 42. A baffle 70 ducts sound from the loudspeaker 34 into the open T-shaped coupling of a T-shaped tube with a first closed end 16 and a second closed end 17. The T-shaped tube defines two closed-end cylinders 30, as illustrated by FIG. 3. The frequency of the sound waves from the loudspeaker 34 is selected to be a resonant frequency of the T-shaped tube and corresponds to a wavelength generally equal to the length of the T-shaped tube. The air 4 within the tube therefore resonates. The two capped ends 16, 17 of the T-shaped tube define two nodes 10 with oscillating transverse pressure and little longitudinal air 4 movement. The loudspeaker 34 and T-shaped coupling define a third node 10 at which air 4 oscillates transverse to the direction of sound wave propagation 14, indicated by arrow 46. Two antinodes 12 are defined within the T-shaped tube intermediate to the three nodes 10.

The T-shaped tube is configured for rotation about an axis of rotation 72. In the example of FIG. 7, the axis of rotation 72 is defined by a wire supported by the baffle 70 and engaging the inside 66 of the T-shaped tubing to define a bearing, not shown. The T-shaped tube thus defines a rotor 76. Two node vents 48 are disposed at the two closed ends 16, 17 of the T-shaped tube on the sides 60 opposite to the direction of rotation 74. The two node vents 48 are oriented normal to a radius 75 that is itself normal to the axis of rotation 72. When the loudspeaker 34 is activated and the air 4 in the T-shaped tube is resonating with nodes 10 at the closed ends 16, 17 of the tube, the thrust generated by the node vents 48 causes the rotor 76 to rotate 74 about the axis of rotation 72.

Figure 8:
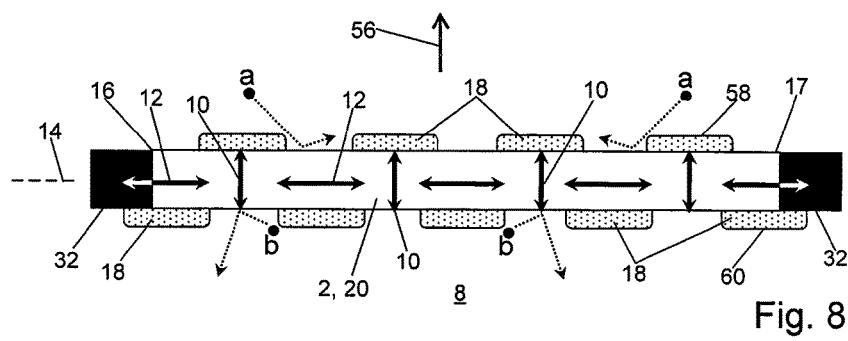
FIG. 8 is a schematic representation of a solid medium having barriers corresponding both to the nodes and anti-nodes.
Figure 9:
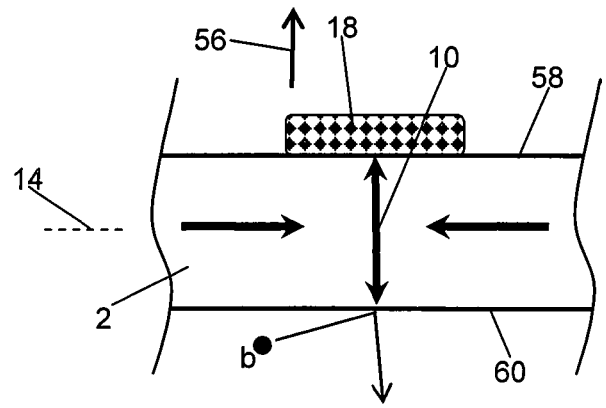
FIG. 9 is a schematic representation of a barrier on a solid medium at a node.
Figure 10:
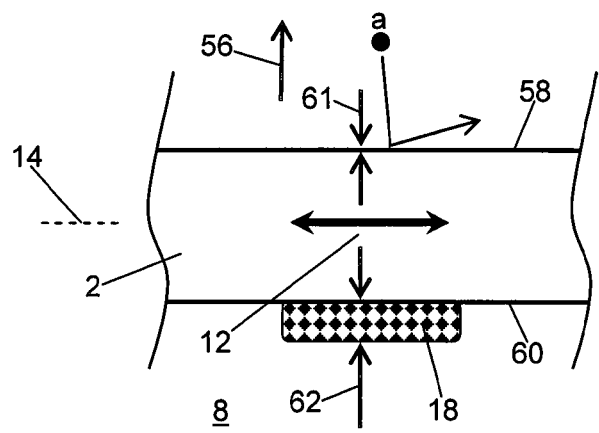
FIG. 10 is a schematic representation of a barrier on a solid medium at an anti-node.

FIGS. 8-12 illustrate the operation of the Invention where the medium 2 is a solid material, for example an aluminum plate. Unlike a liquid or gaseous medium 2, the shape 20 of the solid medium 2 is not defined by the barrier 18 and the solid medium 2 can be self-supporting. The barrier 18 may be supported by the medium 2, as shown by FIGS. 8-10. The barrier 18 is selected to have an acoustical impedance that is different from that of the medium 2, insulating the medium 2 and the ambient air 8 from interaction with each other at the barrier 18.

FIG. 8 illustrates a solid medium 2, such as an aluminum plate, that is excited at a resonant frequency at the first end 16 and the second end 17 by two exciters 32. The two exciters 32 additively excite the medium 2 and the sound waves from the two exciters 32 constructively interfere to generate a standing sound wave. The solid medium 2 resonates and nodes 10 and anti-nodes 12 occur within the medium 2. Because the speed of sound in a solid medium 2 is generally much faster than the speed of sound in air 4, the resonant frequencies in a solid of given length are higher and the wavelengths longer. In the example of FIG. 8, solid medium 2 is excited to a resonant frequency creating four nodes 10 and five anti-nodes 12, corresponding to a medium that has a length corresponding to two wavelengths of sound at the resonant frequency. The barrier 18 is attached to and supported by the solid medium 2. At the nodes 10, the barrier 18 is disposed on the first side 58 corresponding to the direction of thrust 56. At the antinodes, the barrier is disposed on the second side 60 opposite to the direction of thrust 56.

FIGS. 8 and 9 illustrate interaction between the resonating medium 2 and the ambient air 8 at the node 10. Particles of ambient air 8 are constantly interacting with the surface of the medium 2 that is not shielded by the barrier 18 at the node 10. An air particle 'b' has thermal motion and collides with the surface of the solid medium 2 at the node 10. The surface particles of the medium 2 are vibrating, both due to heat energy and due to the resonant acoustic vibration of the medium 2, transverse to the axis of sound wave propagation 14. The vibrating surface particles of the medium 2 impart momentum to the colliding air particle 'b,' which is more momentum than is received by the medium 2 from the colliding air particle 'b.' The transfer of momentum causes the air particle 'b' to depart at a steeper angle than would otherwise be the case. The transfer of momentum in the direction opposite to the direction of thrust 56 urges the medium 2 in the direction of thrust 56, by conservation of momentum.

FIGS. 8 and 10 illustrate interaction between the resonating medium 2 and the ambient air 8 at an anti-node 12. At the anti-node 12, particles of the solid medium 2 oscillate in the direction of the axis of sound propagation 14. The ambient air 8 on the first side 58 of the medium 2 is exposed to the surface of the oscillating medium 2. The ambient air 8 on the second side 60 of the medium 2 is insulated from the medium 2 by the barrier 18, and so is not exposed to the oscillating medium 2. A particle 'a' of air 8 has thermal motion and collides with the surface of the medium 2. Because of the oscillating motion of surface particles of the medium 2, the particle 'a' gives up more momentum to the medium 2 than it absorbs and rebounds at a trajectory that is shallower with respect to the surface of the medium 2 than would otherwise be the case. The transfer of momentum to the medium 2 from particle 'a' results in a net reaction force in the direction of thrust 56, by conservation of momentum.

As a first alternative explanation, after interacting with horizontally oscillating particles in the medium, reflected particle 'a' has a relatively increased velocity component parallel to the surface of the medium. From the Bernoulli principle, the pressure 61 of the ambient air 8 normal to the oscillating surface of the medium 2 is reduced from ambient pressure 62 against the barrier 18 by the difference in the square of the relative velocities of the ambient air 8 and the surface of the medium 2. Since ambient pressure 62 on the second side 60 is greater than the reduced pressure 61 on the first side 58, the medium 2 is urged in the direction of thrust 56.

As a second alternative explanation of the reduced transverse pressure 61 at the anti-node 12, particle 'a' rebounds from the surface of the medium 2 at a relatively shallow angle and thus stays closer to the surface of the medium 2 than would otherwise be the case. The rebounding particle 'a' collides with other particles of ambient air 8, increasing the components of motion of those particles that are parallel to the surface of the medium 2 and decreasing the components of motion of those particles that will impact the surface of the medium 2. The result is a reduction in the number of collisions between air particles 'a' and the surface of the medium 2 and the reduced pressure 61 acting on the first side 58 at the anti-node 12.

Figure 11:
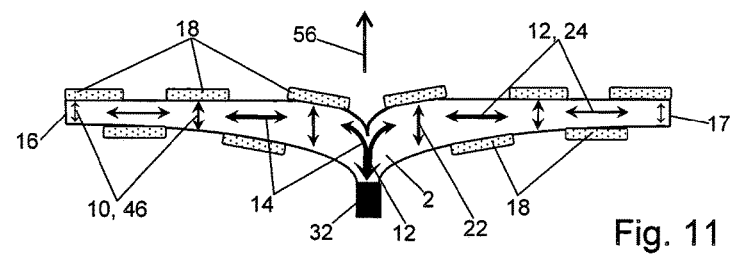
FIG. 11 is a side view of a solid medium with an exciter located at an anti-node.
Figure 12:
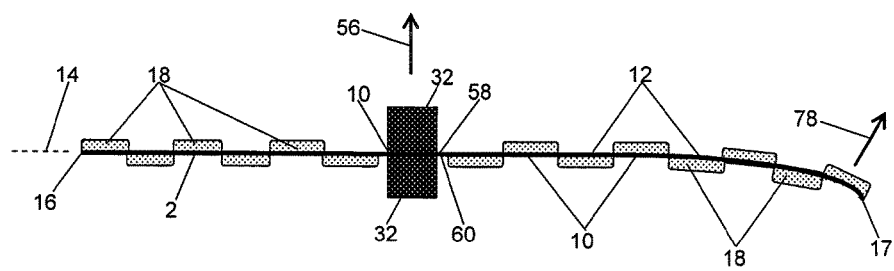
FIG. 12 is a side view of a solid medium with a pair of exciters located on opposite sides of a node.

FIGS. 11 and 12 illustrate additional configurations for thrust utilizing acoustic resonance in a solid medium 2. In FIG. 11, a single exciter 32 is located at an anti-node 12. The sound waves from the single exciter 32 follow the curved shape of the medium 2 so that the direction of sound wave propagation 14 within the resonating medium 2 becomes normal to the orientation of the sound waves generated by exciter 32. FIG. 11 illustrates that the exciter 32 may be located elsewhere than the ends 16, 17 of a resonating member 2. FIG. 11 also illustrates that the shape 20 of the medium 2 may be manipulated to select the node location 22 and the anti-node location 24. The apparatus of FIG. 11 may be a shaped as a disk or sheet, or may comprise two or more arms, for all of which FIG. 11 is a schematic cross section. The apparatus of FIG. 11 otherwise operates in the same manner as discussed above for FIGS. 8-10.

FIG. 12 illustrates how orthosonic thrust by acoustic resonance may be induced using a solid medium 2 in the form of a sheet or plate excited at a node 10 and normal to the axis of sound propagation 14. A sheet or plate forming a solid medium 2 may be subject to transverse waves, which bend the medium, as opposed to the longitudinal sound waves discussed above. The apparatus of FIG. 12 includes two exciters 32 located on opposing first and second sides 58, 60 of a node 10 and that oscillate 180 degrees out of phase with each other. Together, the exciters 32 cooperate to squeeze and release the medium 2 at the node 10 in a resonant frequency of the medium 2. The two exciters 32 additively excite the medium 2 and the sound waves from the exciters 32 constructively interfere to generate a standing sound wave. Because the action of the exciters 32 on the medium 2 is equal and opposite, the exciters 32 generate standing longitudinal waves and do not generate transverse waves that bend the medium 2.

FIG. 12 also illustrates how the direction of thrust may be manipulated by shaping the medium 2. The solid medium 2 may be deformed, as shown at the second end 17 of the medium 2. The resonating sound wave will follow the medium 2 and the thrust generated is normal to the medium at the node 10 or anti-node 12. The thrust generated by the node 10 at the deformed second end 17 of the medium of FIG. 12 will be in the direction indicated by arrow 78.

Figure 13:
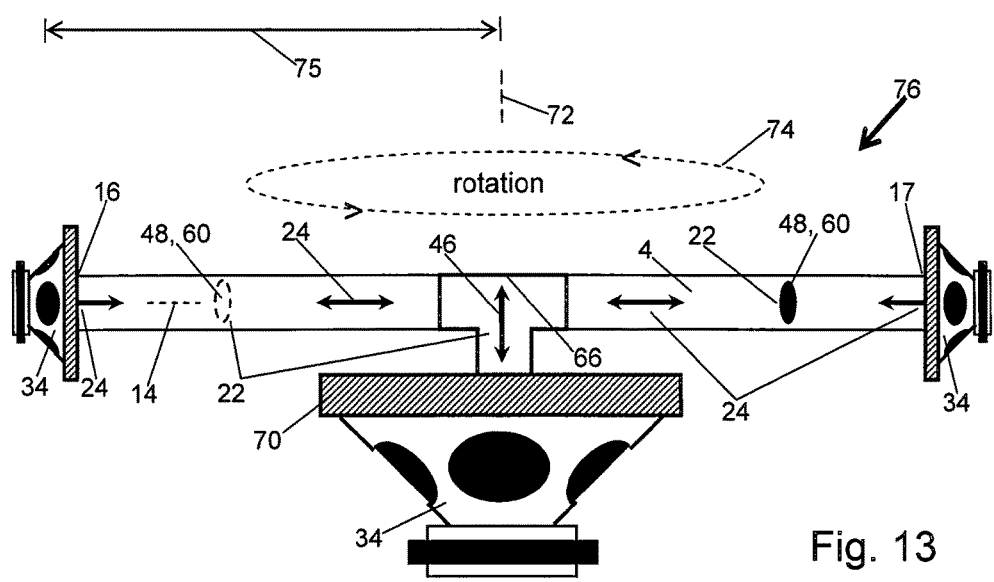
FIG. 13 is an acoustically-powered rotor with loudspeakers activating a central node and two peripheral anti-nodes.

FIG. 13 illustrates a rotor apparatus for orthosonic thrust by acoustical resonance similar to FIG. 7 but employing a plurality of exciters applied to at least one node and at least one anti-node. Loudspeakers 34 are activated by oscillators 40 and amplifiers 42, not shown. A baffle 70 on the central loudspeaker 34 ducts sound from the loudspeaker 34 into the open T-shaped coupling of a T-shaped tube. Two other loudspeakers 34 are ducted by baffles to the effectively open ends 16, and 17. The frequency and phase of the sound waves from the loudspeakers 34 is selected to be a resonant frequency of the T-shaped tube and corresponds generally to 1.5 wavelengths, equaling the horizontal length of the T-shaped tube. The air 4 within the tube therefore resonates. The two effectively open ends 16, 17 of the T-shaped tube define two anti-nodes 24 with oscillating longitudinal air 4 movement and little transverse pressure change. The central loudspeaker 34 and T-shaped coupling define a node 22 at which air 4 oscillates, indicated by arrow 46, transverse to the direction of sound wave propagation 14. Two other nodes 22 are defined within the T-shaped tube intermediate to anti-nodes 24.

As in the example of FIG. 7, the axis of rotation 72 of FIG. 13 is defined by a wire supported by the baffle 70 and engaging the inside 66 of the T-shaped tubing to define a bearing, not shown. The T-shaped tube thus defines a rotor 76. Two node vents 48 are disposed at nodes within the T-shaped tube on the sides 60 opposite to the direction of rotation 74. The two node vents 48 are oriented normal to a radius 75 that is itself normal to the axis of rotation 72. When the loudspeakers 34 are activated and the air 4 in the T-shaped tube is resonating with anti-nodes 24 at the ends 16, 17 of the tube, the thrust generated by the node vents 48 causes the rotor 76 to rotate about the axis of rotation 72.

Figure 14:
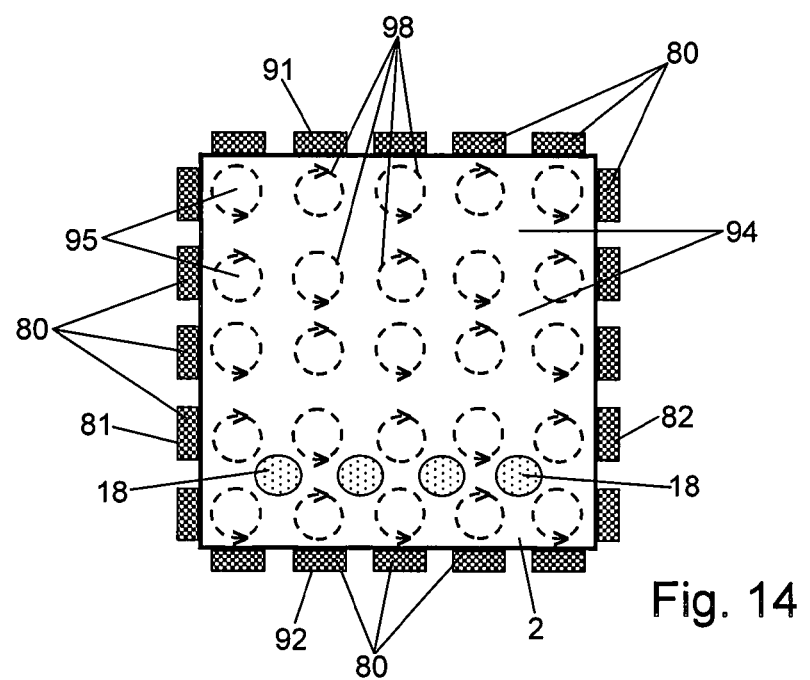
FIG. 14 is a representation of a solid panel sustaining arrays of parallel and non-parallel standing waves.

FIG. 14 illustrates a top view of how multiple standing waves, which may be parallel and nonparallel, may be configured to excite a medium 2 having a broad surface area. In this example, arrays of opposing pairs of piezoelectric exciters 80 are arranged along the edges of medium 2, which is a rectangular solid aluminum plate. The opposing pairs of piezoelectric exciters 80 are disposed on opposite edges of the medium 2, as illustrated by piezoelectric exciters 81 and 82, defining an opposing pair, and by piezoelectric exciters 91 and 92, defining another opposing pair. Any number of opposing pairs of piezoelectric exciters 80 is contemplated by the Invention. The piezoelectric exciters 80 are driven by a control system that operates signal generators and amplifiers, not shown, to produce a standing sound wave in the medium 2 between each opposing pair of piezoelectric exciters 80.

Where non-parallel standing waves cross in the medium 2, longitudinal particle displacements in two dimensions parallel to the surface of the medium 2 may form Lissajous patterns 98, such as circles, ellipses and lines. In the Lissajous pattern 98, anti-nodes combine and cooperate to define mutual anti-nodes 95 of oscillating motion of the surface of the medium 2 parallel to the surface of the medium 2.

Where non-parallel standing wave nodes intersect, the nodes combine and cooperate to define mutual nodes 94. At the mutual nodes 94, the medium 2 oscillates transverse to the direction of oscillation at the mutual anti-nodes 95, and, where the medium 2 is flat, transverse to the surface of the medium 2. The mutual nodes 94 occur in the areas of the medium 2 between the Lissajous patterns 98.

In the same manner described above for FIGS. 8-12, a barrier 18 disposed on the surface of the medium 2 at the location of mutual nodes 94 will result in a net thrust in the direction of the barrier 18. Also in the same manner described above for FIGS. 8-12, a barrier 18 located on the surface of the medium 2 at the location of mutual anti-nodes 95 will result in a net thrust in a direction opposite to the barrier 18.

Figure 15:
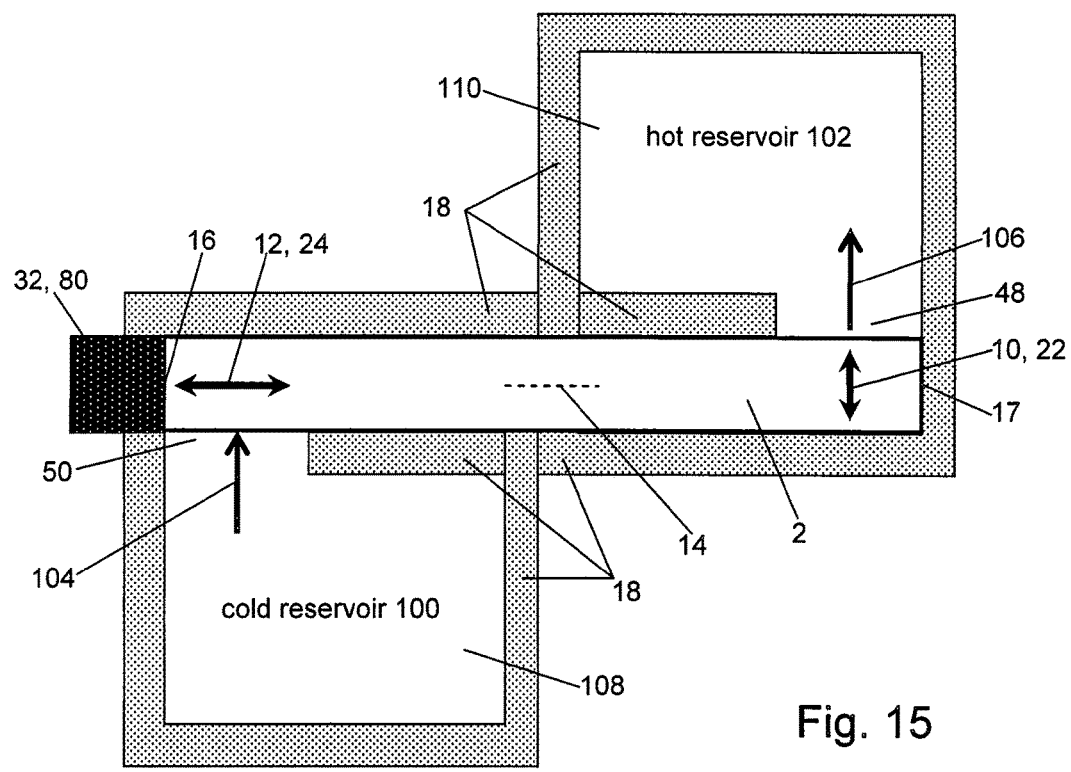
FIG. 15 is a representation of a solid medium employing a standing wave to pump momentum from one reservoir to another.

FIG. 15 illustrates a solid medium 2, such as an aluminum plate coupled to an exciter 80. The exciter is driven by an amplified signal which excites a standing wave in the length of the medium. FIG. 15, illustrates a standing wave having a wavelength generally four times the length of the medium with an anti-node 12 at the first end 16 of the medium and a node 10 at the second end 17 of the medium. Signals corresponding to other standing wave frequencies may also be employed.

The apparatus may be largely enclosed in a barrier 18 such as fiberglass, which is of an acoustic impedance substantially different than that of the medium and, in this example, is also a thermal insulator. The barrier is not disposed at an area on the surface of the medium 50 transverse to the anti-node 12 and in contact with cold reservoir 100 containing material 108 to be cooled. The barrier is also not disposed at an area of the surface of the medium 48 transverse to the node 10 and in contact with hot reservoir 102 containing material to be heated 110.

For reasons described with FIG. 10, momentum and energy 104 from particles of the material to be cooled 108 in the cold reservoir 100 and into the standing wave medium 2. For reasons described with FIG. 9, momentum and energy 106 leave the standing wave medium 2 and enter the material to be heated 110 in hot reservoir 102.

By this method, and because of the known tendency of temperature to vary with pressure, orthosonic thrust provides a simple means of thermoacoustic heat exchange without the need to create a standing wave in a fluid medium and without requiring a stack for heat exchange within the medium 2. As one example application, the material to be cooled 108 might be an integrated circuit chip and the material to be heated 110 might be ambient air. In such an application the barrier may be variably disposed around the reservoirs 100, 102 and the medium to optimize the desired heat exchange.

Experimental Results

Referring to FIG. 3, a loudspeaker 34 was mounted to a wooden baffle 70 having a 4 cm port. The first end 16 of a 95 cm long PVC pipe was mounted to the baffle 70. A PVC end cap was mounted to the second end 17 of the PVC pipe to act as a reflector, and with the PVC pipe defined a closed cylinder 30. When the loudspeaker 34 was powered by a sine wave amplified to 5 watts, the first resonant frequency of the air 4 in the closed cylinder 30 was observed at 89 Hz. A Venturi pressure gauge 44 revealed that the average transverse air pressure at the anti-node 12 near the loudspeaker 34 was lower than the average transverse air pressure at the node 10 at the second end 17 of the cylinder 30 by a 5.1 cm difference Δ in water levels. When power to the woofer was increased to 10 watts, the measured difference Δ in transverse air pressures increased to 9.4 cm. The difference Δ in transverse air pressures between the node 10 and anti-node 12 was greatly diminished with a change in frequency greater than ±10 Hz from the resonance frequency.

Referring to FIG. 4, a three inch diameter, 15 watt capacity, midrange Sony loudspeaker was mounted to a wooden baffle 70 having a 3.2 cm central port. Into the port a 76 cm long cardboard tube 6 was snuggly attached. The cardboard tube 6 defined the barrier 18. The tube 6 had an oval port (7 cm×3 cm) cut below its mid length as the node vent 48 and another (3.5 cm×3.0 cm) cut above its open, far end as the anti-node vent 50. The first harmonic of the air 4 resonating within this tube was observed at 310 Hz (±7 Hz) corresponding to a half wavelength of 76 cm.

At 10 watts power and with the apparatus on a scale with the node vent 48 facing downward and the anti-node vent 50 facing upward, a reduction in apparent mass of 0.7 grams was observed, consistent with upward orthosonic thrust 56. The effect was undetectable below 303 Hz and above 317 Hz. When the barrier was rotated 180° about its long axis, so that the node vent 48 faced upward and the anti-node vent 50 faced downward, the 10 watt, 310 Hz signal applied to the loudspeaker 34 resulted in an increase in apparent mass of 0.7 grams, consistent with downward orthosonic thrust. When the tube was rotated 90° from its original position, so that the node 48 and anti-node vent 50 faced horizontally, the 10 watt, 310 Hz sound produced no change in apparent mass but a displacement attributable to horizontal torque was observed, all consistent with horizontal orthosonic thrust.

Referring to FIG. 7, a loudspeaker 34 with a baffle 70 was driven by an amplified sine wave. The center of the baffle 70 had a ¾ inch diameter central port into which a PVC T-shaped connector could fit. The T-piece had a small dimple drilled inside it so that it could balance and rotate on a pivot wire about an axis of rotation 72. The pivot wire attached inside the baffle and extended vertically through the port defined by the baffle 70. Two pieces of PVC pipe of ½ inch internal diameter and of equal lengths were inserted on opposite sides laterally from the T-connector. Both ends 16, 17 terminated in PVC end caps to define a T-shaped cylinder with closed ends 16, 17. The first end 16 and second end 17 each had a ½ by ¼ inch oval port cut out, facing opposite to each other and perpendicular to the PVC pipe lengths. The length from one end cap port to the other was 134 cm.

When the loudspeaker 34 was activated with a sine wave of 10 watts and 255 Hz (±25 Hz) the PVC assembly began to rotate vigorously about the axis of rotation 72 at about 20 rpm. This is consistent with a transversely activated central node 10 at the T-shaped connector and two passive nodes 10 at the first end 16 and second end 17 with antinodes having maximal longitudinal particle velocities midway between nodes 10. In this example, orthosonic thrust provides horizontal torque.

LIST OF NUMBERED ELEMENTS

The following is a list of the numbered elements.

a medium 2
air 4
open cylinder 6
ambient air 8
node 10
anti-node 12
axis 14 of sound wave propagation
first end 16
second end 17
barrier 18
shape 20 of the medium
node location 22
anti-node location 24
a first acoustical impedance 26
a second acoustical impedance 28
closed cylinder 30
exciter 32 loudspeaker 34
transducer 36
diaphragm 38
oscillator 40
amplifier 42
pressure gauge 44
arrow indicating transverse motion at a node 46
node vent 48
anti-node vent 50
interior of the barrier 52
exterior of the barrier 54
a direction of intended thrust 56
a first side of the barrier 58
a second side of the barrier 60
reduced ambient pressure 61
ambient pressure 62
air pressure at the node 64
inside surface 66
air pressure at the anti-node 68
baffle 70
axis 72 of rotation of the T-shaped coupling
direction of rotation 74
radius 75
rotor 76
arrow indicating direction of thrust of a deformed portion of the medium 78
piezoelectric transducer element 80
first of an opposing pair of transducers 81
second of an opposing pair of transducers 82
first of a different opposing pair of transducers 91
second of a different opposing pair of transducers 92
mutual node location 94
mutual anti-node location 95
representative Lissajous pattern particle motion 98
cold reservoir 100
hot reservoir 102
momentum and energy flow into standing wave medium 104
momentum and energy flow out of standing wave medium 106
material to be cooled 108
material to be heated 110

I claim:

1. An apparatus for generating an orthosonic thrust in a direction, the apparatus comprising:
   a. A medium that has a first acoustical impedance and a medium shape, said medium being a solid, said medium and said medium shape are selected to support a standing sound wave within said medium when said medium is acoustically excited at a resonant frequency, said standing sound wave defines a node and an anti-node within said medium, said node having a node location and said anti-node having an anti-node location, the apparatus having a first side corresponding to the direction of orthosonic thrust, the apparatus having a second side opposite to said first side;
   b. A barrier, said barrier has a second acoustical impedance, said second acoustical impedance is different from said first acoustical impedance, said barrier is disposed at said node location on said first side and said barrier is not disposed at said node location on said second side, whereby said barrier acoustically insulates said medium at said first side from an ambient air at said node when said barrier and said medium are immersed in said ambient air.

2. The apparatus of claim 1 wherein said barrier is disposed at said anti-node location on said second side and said barrier is not disposed at said anti-node location on said first side, whereby said barrier acoustically insulates said medium at said second side from said ambient air at said anti-node location when said barrier and said medium are immersed in said ambient air.

3. The apparatus of claim 2 wherein said medium defines an axis of sound wave propagation when said medium supports said standing sound wave, the apparatus further comprising: an exciter, said exciter being acoustically coupled to said medium, said exciter being configured to excite said medium at said resonant frequency.

4. The apparatus of claim 3 wherein said exciter is acoustically coupled to said medium at said anti-node location, said exciter being configured to excite said medium along said axis of sound wave propagation.

5. The apparatus of claim 4 wherein said anti-node is one of a plurality of anti-nodes defined by said standing wave within said medium when said medium is acoustically excited at said resonant frequency, each of said anti-nodes having a one of a plurality of anti-node locations, said exciter being a one of a plurality of exciters, each of said exciters being acoustically coupled to said medium at a one of said anti-node locations and configured to excite said medium along said axis of sound wave propagation.

6. The apparatus of claim 5 wherein said shape of said medium defines a first end and a second end opposite to said first end, a one of said anti-nodes being located at each of said first end and second end when said medium is acoustically excited, a one of said plurality of exciters being located at said first end and another of said plurality of exciters being located at said second end.

7. The apparatus of claim 3 wherein said exciter is acoustically coupled to said medium at said node location, said exciter being configured to excite said medium transverse to said axis of sound wave propagation.

8. The apparatus of claim 7 wherein said exciter is one of a plurality of said exciters, each of said plurality of exciters being acoustically coupled to said medium at said node location, said plurality of exciters being configured to acoustically excite said medium additively to generate said standing wave, whereby sound waves generated by said plurality of exciters constructively interfere to generate said standing wave.

9. The apparatus of claim 3 wherein said exciter is a one of plurality of exciters and said node and said anti-node are two of a plurality of nodes and anti-nodes, said plurality of exciters being acoustically coupled to said medium at said plurality of nodes and anti-nodes, said plurality of exciters are configured to excite said medium additively at said resonant frequency so that sound waves generated by said plurality of exciters constructively interfere to generate said standing wave.

10. The apparatus of claim 3 wherein said exciter is selected from a list consisting of a piezoelectric material, a loudspeaker, an electromagnetic exciter, a piston in a cylinder, a reed, and a moving diaphragm.

11. The apparatus of claim 3 wherein said exciter is a one of a plurality of exciters, each of said plurality of exciters being acoustically coupled to said medium, said medium and said plurality of exciters being configured to generate a plurality of standing waves within said medium when said plurality of exciters are acoustically exciting said medium, said plurality of standing waves defining a plurality of mutual nodes and mutual anti-nodes, said barrier being a one of a plurality of barriers, a one of said barriers being disposed on said first side of said medium proximal to a one of said mutual nodes, another of said barriers being disposed on said second side proximal to a one of said mutual anti-nodes.

12. An apparatus for generating an orthosonic thrust in a direction, the apparatus comprising:
   a. A medium that has a first acoustical impedance and a medium shape, said medium being a solid, said medium and said medium shape are selected to support a standing sound wave within said medium when said medium is acoustically excited at a resonant frequency, said standing sound wave defines a node and an anti-node within said medium, said node having a node location and said anti-node having an anti-node location, the apparatus having a first side corresponding to the direction of orthosonic thrust, the apparatus having a second side opposite to said first side;
   b. A barrier, said barrier has a second acoustical impedance, said second acoustical impedance is different from said first acoustical impedance, said barrier is disposed at said node location on said first side, said barrier is disposed at said anti-node location on said second side, whereby said barrier acoustically insulates said medium at said first side from an ambient air at said node when said barrier is immersed in said ambient air and whereby said barrier acoustically insulates said medium at said second side from said ambient air at said anti-node location when said barrier is immersed in said ambient air, and wherein said medium defines an axis of sound wave propagation when said medium supports said standing sound wave;
   c. an exciter, said exciter being acoustically coupled to said medium at said node location, said exciter being configured to excite said medium at said resonant frequency transverse to said axis of sound wave propagation wherein said node is one of a plurality of nodes defined by said standing wave within said medium when said medium is acoustically excited at said resonant frequency, each of said nodes having a one of a plurality of node locations, said exciter being a one of a plurality of exciters, each of said exciters being acoustically coupled to said medium at a one of said node locations and configured to excite said medium transverse to said axis of sound wave propagation.

13. A method of providing orthosonic thrust, the thrust having a direction, the method comprising:
   a. providing a medium that is a solid and that has a first acoustical impedance, said medium has a shape, said medium is configured to be acoustically excited and to acoustically resonate at a resonant frequency to create a standing sound wave within said medium, said standing sound wave defines a node and an anti-node, said node having a node location and said anti-node having an anti-node location, said medium has a first side corresponding the direction of orthosonic thrust, said medium has a second side opposite to said first side;
   b. providing a barrier, said barrier has a second acoustical impedance, said second acoustical impedance is different from said first acoustical impedance, said barrier is disposed at said node location on said first side, said barrier is not disposed at said node location on said second side;
   c. providing an exciter, said exciter exciting said medium at said resonant frequency, whereby said barrier acoustically insulates said medium at said node location on said first side from an ambient air when said medium is resonating at said resonant frequency and said medium and said barrier are immersed in said ambient air.

14. The method of claim 13 wherein said barrier is disposed at said anti-node location on said second side, whereby said barrier acoustically insulates said medium at said second side from said ambient air at said anti-node location.

15. The method of claim 14 wherein said exciter is acoustically coupled to said medium at said anti-node location, said exciter exciting said medium along an axis of sound wave propagation.

16. The method of claim 15 wherein said anti-node is one of a plurality of anti-nodes defined by said standing wave within said medium, each of said anti-nodes having a one of a plurality of anti-node locations, said exciter being a one of a plurality of exciters, each of said exciters being acoustically coupled to said medium at a one of said anti-node locations and exciting said medium at said resonant frequency along said axis of sound wave propagation.

17. The method of claim 14 wherein said exciter is acoustically coupled to said medium at said node location, said exciter exciting said medium transverse to said axis of sound wave propagation.

18. The method of claim 17 wherein said node is one of a plurality of nodes defined by said standing wave within said medium when said medium is acoustically excited at said resonant frequency, each of said nodes having a one of a plurality of node locations, said exciter being a one of a plurality of exciters, each of said exciters being acoustically coupled to said medium at a one of said node locations and exciting said medium transverse to said axis of sound wave propagation.

19. The method of claim 17 wherein said exciter is one of a pair of said exciters, each of said exciters being acoustically coupled to said acoustical medium at said node location, a first of said exciters being located on said first side and a second of said exciters being located on said second side, said exciters exciting said medium additively at said resonant frequency so that sound waves generated by said exciters constructively interfere to generate said standing wave.

20. The method of claim 13 wherein said medium defines a surface and an axis of sound propagation, said medium being in thermal communication with a material to be heated at said surface of said medium proximal to said node and transverse to said axis of sound propagation and in thermal communication with a material to be cooled at said surface of said medium proximal to said anti-node and transverse to said axis of sound propagation, whereby the orthosonic thrust of the resonating solid medium cools said material to be cooled and warms said material to be heated.

* * * * *